United States Patent
Yang et al.

(10) Patent No.: US 11,455,267 B1
(45) Date of Patent: Sep. 27, 2022

(54) CALIBRATION METHOD FOR CURRENT DETECTION AND PROTECTION MECHANISM AND CALIBRATION DEVICE USING SAME

(71) Applicant: Primax Electronics Ltd., Taipei (TW)

(72) Inventors: Shun-Fu Yang, Taipei (TW); Wei-Cheng Chen, Taipei (TW); Jen-Cheng Li, Taipei (TW); Wen-Hsien Chan, Taipei (TW); Po-Yao Fang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/483,739

(22) Filed: Sep. 23, 2021

(30) Foreign Application Priority Data

Jul. 12, 2021 (TW) .................................. 110125475

(51) Int. Cl.
*G06F 3/00* (2006.01)
*G06F 13/38* (2006.01)
*G06F 13/40* (2006.01)
*G06F 13/42* (2006.01)
*H02J 7/00* (2006.01)
*G06F 1/3215* (2019.01)

(52) U.S. Cl.
CPC .......... *G06F 13/387* (2013.01); *G06F 1/3215* (2013.01); *G06F 13/4068* (2013.01); *G06F 13/4282* (2013.01); *H02J 7/0036* (2013.01); *H02J 7/00304* (2020.01); *G06F 2213/0042* (2013.01)

(58) Field of Classification Search
None
See application file for complete search history.

(56) References Cited

U.S. PATENT DOCUMENTS

| 9,906,143 | B1* | 2/2018 | Yu ..................... H02M 3/33592 |
| 10,365,345 | B1* | 7/2019 | Bradley ................... H04B 1/40 |
| 2010/0315067 | A1* | 12/2010 | Cornelius .............. H01H 83/20 324/202 |
| 2018/0359466 | A1* | 12/2018 | Sugiura .................. H04N 17/04 |

* cited by examiner

*Primary Examiner* — Henry Tsai
*Assistant Examiner* — Dean Phan
(74) *Attorney, Agent, or Firm* — Kirton McConkie; Evan R. Witt

(57) ABSTRACT

A calibration device includes a main control unit, an interface conversion unit and an electronic load generation unit. The electronic load generation unit provides an electronic load, so that a USB control chip generates a constant load current. The USB control chip uses at least one preset conversion parameter to generate an analog-to-digital conversion value according to the constant load current. The main control unit generates a to-be-calibrated output current according to the analog-to-digital conversion value. The main control unit generates at least one calibrated conversion parameter according to the constant load current and the to-be-calibrated output current. The USB control chip uses the at least one calibrated conversion parameter to generate a calibrated analog-to-digital conversion value, so that an over current protection mechanism is accurately enabled.

20 Claims, 7 Drawing Sheets

CALIBRATION METHOD FOR CURRENT DETECTION AND PROTECTION MECHANISM AND CALIBRATION DEVICE USING SAME

FIELD OF THE INVENTION

The present invention relates to a calibration method for a current detection and protection mechanism and a calibration device using the calibration method, and more particularly to a calibration method for a current detection and protection mechanism of a universal serial bus (USB) control chip and a calibration device using the calibration method.

BACKGROUND OF THE INVENTION

The universal serial bus (USB) transfer specification has been an interface transmission standard that is widely adopted by various electronic devices. In particular, the Type C universal serial bus (USB-C) transfer specification has become popular in recent years. On the basis of the USB standard, the USB-C transfer specification provides the higher power transfer capacity and the faster data transfer speed in order to meet the increasing needs of achieving the connection between modern electronic devices.

The USB-C transfer specification has a Power Delivery (PD) function protocol, which is the basis for achieving the higher power transfer capability (including the capability of providing large wattage power). Consequently, regardless of whether a general-purpose microprocessor chip or a special-purpose single chip implemented according to the USB-C transfer specification is used as the Type-C (USB-C) control chip, the design of the control chip needs to comply with the Power Delivery (PD) function protocol. Furthermore, since the implementation of the PD function protocol can deliver the large wattage power to electronic products, the USB-C control chip is usually equipped with an over current protection (OCP) mechanism to protect various electronic products that are electrically connected to the USB-C control chip.

Moreover, when the USB-C control chip implements the PD function protocol, the USB-C control chip uses a preset analog-to-digital conversion module to perform an analog-to-digital signal conversion process according to at least one preset conversion parameter matching the preset analog-to-digital conversion module. Consequently, an analog transmission current to be outputted from the USB-C control chip is firstly converted into an analog-to-digital conversion value (ADC value), and a storage recording process is performed. If the USB-C control chip detects that the analog transmission current is equal to or higher than a preset power-off protection threshold according to the analog-to-digital conversion value, the USB-C control chip needs to immediately stop outputting the analog transmission current. Consequently, the over current protection mechanism can be enabled.

Generally, the analog-to-digital conversion module is a set of conversion calculation formulas. Generally, the analog-to-digital conversion module is built in the USB-C control chip in a firmware manner. The at least one preset conversion parameter is the important parameter involved in the calculation process of the analog-to-digital conversion module. The technologies of the analog-to-digital conversion module and the at least one preset conversion parameter are well known to those skilled in the art, and not redundantly described herein.

In practice, when the production cost is taken into consideration, the lower-level control chip is usually used to implement the USB-C transfer specification. However, the use of the low-level control chip usually has some drawbacks. For example, since the capability of the control chip to withstand noise is weak or the analog-to-digital conversion resolution of the control chip is poor, the USB-C control chip is prone to large conversion errors during the process of converting the analog transmission current into the analog-to-digital conversion value. Consequently, the generated analog-to-digital conversion value is suffered from serious inaccuracy or deviation. Due to the inaccuracy or deviation, the over current protection mechanism may be enabled too early or too late. If the over current protection mechanism is enabled too early, the USB-C control chip cannot be powered normally. If the over current protection mechanism is enabled too late, various electronic products that are electrically connected to the USB-C control chip face a highly dangerous situation of a large current impact.

For overcoming the drawbacks of the conventional technologies, there is a need of providing a method for allowing the USB-C control chip to accurately convert and record the real output current value and accurately enable the over current protection mechanism while achieving the cost-effectiveness of the electronic product.

SUMMARY OF THE INVENTION

An object of the present invention provides a calibration method and a calibration method for calibrating a USB control chip and allowing the USB control chip to generate an accurate analog-to-digital conversion value.

Another object of the present invention provides a calibration method and a calibration method for calibrating a USB control chip and allowing the USB control chip to accurately enable an over current protection (OCP) mechanism.

In accordance with an aspect of the present invention, a calibration method for a current detection and protection mechanism is provided. The calibration method is used with a universal serial bus control chip. The calibration method includes the following steps. In a step (a), a calibration device is provided, and the calibration device is electrically connecting with the universal serial bus control chip. The universal serial bus control chip has at least one preset conversion parameter. The calibration device includes a to-be-calibrated current backward calculation means and the at least one preset conversion parameter. In a step (b), the calibration device providing an electronic load, so that a constant load current is generated. In a step (c), the calibration device acquires an analog-to-digital conversion value from the universal serial bus control chip. The universal serial bus control chip uses the at least one preset conversion parameter to generate the analog-to-digital conversion value according to the constant load current. In a step (d), the calibration device uses the to-be-calibrated current backward calculation means and the at least one preset conversion parameter in the calibration device to generate and store a to-be-calibrated output current according to the analog-to-digital conversion value. According to a number of the at least one preset conversion parameter, the steps (b), (c) and (d) are performed for one or plural times. Consequently, one or plural constant load currents are sequentially generated, one or plural analog-to-digital conversion values are sequentially generated, and one or plural to-be-calibrated output currents are sequentially generated. In a step (e), the calibration device uses a conversion parameter calibration means in the calibration device to generate at least one calibrated conversion parameter according to the one or plural constant load currents and the one or plural to-be-calibrated output currents. In a step (f), the at least one preset conversion parameter in the universal serial bus control chip is replaced with the at least one calibrated conversion parameter by the calibration device. The universal serial bus control chip uses the at least one calibrated conversion parameter to generate a calibrated analog-to-digital conversion value. Consequently, an over current protection (OCP) mechanism is accurately enabled.

Preferably, before the step (b), the calibration method further includes a step (b1) of initializing the universal serial bus control chip by the calibration device.

Preferably, in the step (c), the universal serial bus control chip uses an analog-to-digital conversion module and the at least one preset conversion parameter to convert the constant load current into the analog-to-digital conversion value.

In an embodiment, the at least one preset conversion parameter and the analog-to-digital conversion module match each other, and the to-be-calibrated current backward calculation means in the calibration device further includes the analog-to-digital conversion module.

In an embodiment, the number of the at least one preset conversion parameter is 2 in the step (d), and the steps (b), (c) and (d) are performed twice. The calibration device generates two constant load currents sequentially. The universal serial bus control chip generates two analog-to-digital conversion values sequentially according to the two constant load currents. The calibration device generates two to-be-calibrated output currents sequentially according to the two analog-to-digital conversion values.

In an embodiment, in the step (e), the calibration device uses the conversion parameter calibration means in the calibration device to generate two calibrated conversion parameters according to the two constant load currents and the two to-be-calibrated output currents.

In an embodiment, the step (f) includes the following steps (f1), (f2), (f3), (f4) and (f5). Firstly, in the step (f1), the at least one preset conversion parameter in the universal serial bus control chip is replaced with the at least one calibrated conversion parameter by the calibration device, wherein the universal serial bus control chip uses the at least one calibrated conversion parameter to generate the calibrated analog-to-digital conversion value according to the constant load current. In the step (f2), the calibration device provides another electronic load, so that a constant overload current is generated. The step (f3) is performed to judge whether the over current protection mechanism is enabled by the universal serial bus control chip in response to the constant overload current. In the step (f4), if the over current protection mechanism is not enabled by the universal serial bus control chip, the steps (b), (c), (d), (f1), (f2) and (f3) are repeatedly done. In the step (f5), if the over current protection mechanism is enabled by the universal serial bus control chip, the calibration method is ended.

Preferably, in the step (f2), the constant overload current is higher than or equal to a power interruption protection threshold for allowing the universal serial bus control chip to stop outputting a current.

Preferably, in the steps (f4) and (f5), the over current protection mechanism is enabled when an output voltage from an over current protection pin of the universal serial bus control chip is switched from a first voltage level state to a second voltage level state in response to the constant overload current, and the over current protection mechanism is not enabled when the output voltage from the over current protection pin of the universal serial bus control chip is maintained at the first voltage level state and not switched to the second voltage level state in response to the constant overload current.

In an embodiment, the universal serial bus control chip is a Type C universal serial bus (USB-C) control chip complying with a Power Delivery (PD) function protocol.

In an embodiment, the Type C universal serial bus control chip is installed in an electronic product or an under-test circuit board. The electronic product or the under-test circuit board is electrically connected with the calibration device, and the electronic product or the under-test circuit board is equipped with a universal serial bus port.

In accordance with another aspect of the present invention, a calibration device for a current detection and protection mechanism is provided. The calibration device is used with a universal serial bus control chip with at least one preset conversion parameter. The calibration device includes an electronic load generation unit, an interface conversion unit and a main control unit. The electronic load generation unit is electrically connected with the universal serial bus control chip. The electronic load generation unit provides an electronic load, so that the universal serial bus control chip generates a constant load current. The universal serial bus control chip uses the at least one preset conversion parameter to generate an analog-to-digital conversion value according to the constant load current. The interface conversion unit is electrically connected with the universal serial bus control chip. If the analog-to-digital conversion value does not comply with a universal serial bus transfer specification, the analog-to-digital conversion value is converted into the analog-to-digital conversion value complying with the universal serial bus transfer specification by the interface conversion unit. The main control unit is electrically connected with the electronic load generation unit and the interface conversion unit. After the analog-to-digital conversion value complying with the universal serial bus transfer specification is inputted into the main control unit, the main control unit uses a to-be-calibrated current backward calculation means in the calibration device and the at least one preset conversion parameter to generate and store a to-be-calibrated output current according to the analog-to-digital conversion value complying with the universal serial bus transfer specification. The main control unit uses a conversion parameter calibration means in the main control unit to generate at least one calibrated conversion parameter according to the constant load current and the to-be-calibrated output current. The at least one preset conversion parameter in the universal serial bus control chip is replaced with the at least one calibrated conversion parameter by the main control unit. The universal serial bus control chip uses the at least one calibrated conversion parameter to generate a calibrated analog-to-digital conversion value, so that an over current protection mechanism is accurately enabled.

In an embodiment, the universal serial bus control chip is a Type C universal serial bus (USB-C) control chip complying with a Power Delivery (PD) function protocol.

In an embodiment, the Type C universal serial bus control chip is installed in an electronic product or an under-test circuit board. The electronic product or the under-test circuit board is electrically connected with the electronic load generation unit and the interface conversion unit.

In an embodiment, the electronic product or the under-test circuit board is equipped with a universal serial bus port, and a power cable set of the universal serial bus port is electrically connected with the electronic load generation unit directly. Consequently, the Type C universal serial bus control chip generates and outputs the constant load current according to the electronic load.

In an embodiment, the calibration device further includes a power delivery function detection unit, and the power delivery function detection unit is electrically connected between the universal serial bus port and the electronic load generation unit. A power cable set of the universal serial bus port is electrically connected with the electronic load generation unit directly. Consequently, the Type C universal serial bus control chip generates and outputs the constant load current according to the electronic load.

In an embodiment, the power delivery function detection unit is electrically connected between the universal serial bus port and the main control unit. The main control unit communicate with the Type C universal serial bus control chip through the power delivery function detection unit to confirm a voltage specification range according to the Power Delivery function protocol. Consequently, the electronic load generation unit generates the corresponding electronic load. The Type C universal serial bus control chip generates and outputs the constant load current according to the electronic load.

In an embodiment, the calibration device provides another electronic load, so that the universal serial bus control chip generates a constant overload current. The over current protection mechanism is accurately enabled by the universal serial bus control chip in response to the constant overload current. The over current protection mechanism is enabled when an output voltage from an over current protection pin of the universal serial bus control chip is switched from a first voltage level state to a second voltage level state in response to the constant overload current.

In an embodiment, each of the universal serial bus control chip and the to-be-calibrated current backward calculation means in the main control unit further includes an analog-to-digital conversion module, and the universal serial bus control chip uses the analog-to-digital conversion module and the at least one preset conversion parameter to convert the constant load current into the analog-to-digital conversion value. Alternatively, the universal serial bus control chip uses the analog-to-digital conversion module and the at least one at least one calibrated conversion parameter to convert the constant load current into the calibrated analog-to-digital conversion value. Alternatively, the main control unit uses the to-be-calibrated current backward calculation means with the analog-to-digital conversion module and the at least one preset conversion parameter to generate and store the to-be-calibrated output current.

In an embodiment, the non-universal serial bus transfer specification is one of an Inter-Integrated Circuit (I²C) bus transfer specification, a Universal Asynchronous Receiver Transmitter (UART) bus transfer specification and a Serial Peripheral Interface (SPI) bus transfer specification.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

In this context, the universal serial bus (USB) control chip is a Type C Universal Serial Bus (USB-C) control chip with a Power Delivery (PD) function. The Power Delivery (PD) function refers to a power expansion standard of a universal serial bus that can provide a maximum of 100 W (watts) power supply through a universal serial bus. In addition, the supported voltage range can be expanded from the original standard 5V (volt) to 20V (volt), and the supported current range can be expanded from the original standard 2 A (Ampere) to 5 A (Ampere).

It is noted that the concepts of the present invention are not restricted. Moreover, other universal serial bus (USB) control chips that are more advanced or updated in the future and provide the similar Power Delivery (PD) function can be applied to the calibration method and the calibration device of the present invention. The technologies of the present invention will be described as follows.

Figure 1A:
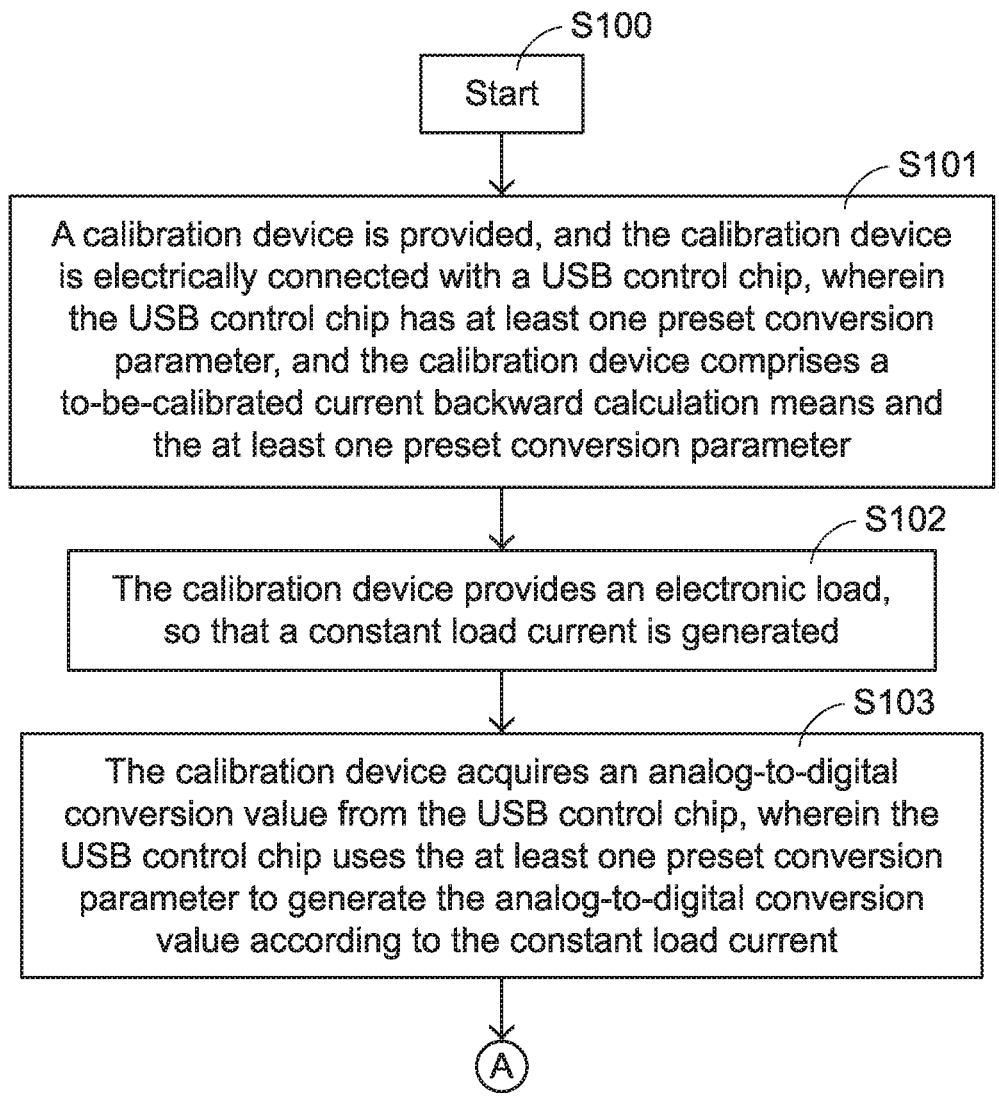
FIGS. 1A and 1B are a flowchart of a calibration method for a current detection and protection mechanism according to a first embodiment of the present invention.
Figure 1B:
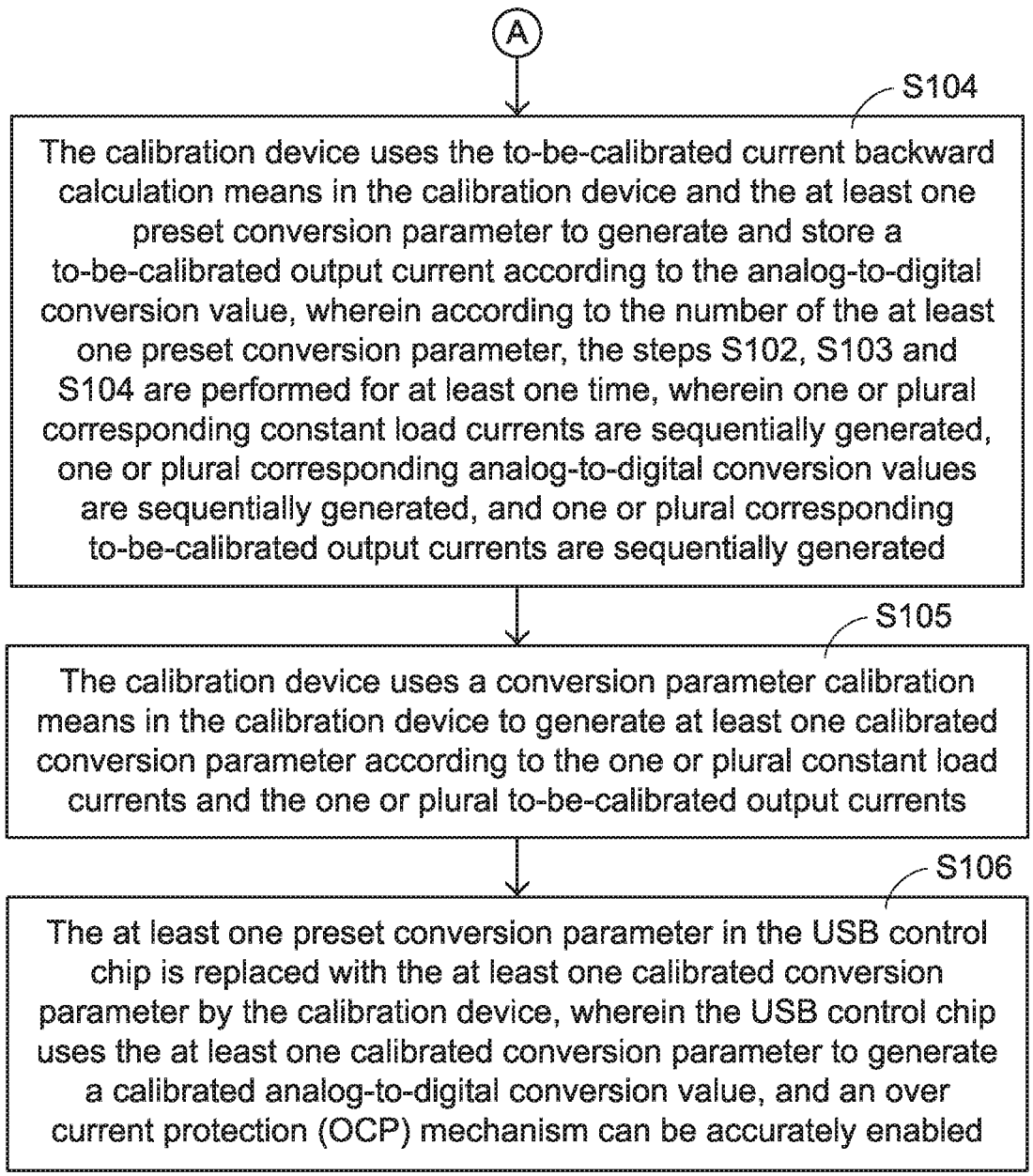

The present invention provides a calibration method for a current detection and protection mechanism. FIGS. 1A and 1B are a flowchart of a calibration method for a current detection and protection mechanism according to a first embodiment of the present invention. The calibration method at least comprises the following steps.

In a step S100, the calibration method is started.

In a step S101, a calibration device is provided, and the calibration device is electrically connected with a USB control chip. The USB control chip has at least one preset conversion parameter. The calibration device comprises a to-be-calibrated current backward calculation means and the at least one preset conversion parameter.

In an embodiment, the USB control chip is installed in an electronic product or an under-test circuit board. Moreover, the electronic product or the under-test circuit board is electrically connected with the calibration device. For example, the electronic product is a docking station. It is noted that the example of the electronic product is not restricted.

Moreover, the electronic product or the under-test circuit board is equipped with a USB port.

In a step S102, the calibration device provides an electronic load, so that a constant load current is generated.

In a step S103, the calibration device acquires an analog-to-digital conversion value (ADC value) from the USB control chip, wherein the USB control chip uses the at least one preset conversion parameter to generate the analog-to-digital conversion value according to the constant load current.

In an embodiment, the USB control chip uses an analog-to-digital conversion module and the at least one preset conversion parameter to convert the constant load current into the analog-to-digital conversion value.

In an embodiment, the at least one preset conversion parameter and the analog-to-digital conversion module match each other. Moreover, the to-be-calibrated current backward calculation means in the calibration device further comprises the analog-to-digital conversion module.

The analog-to-digital conversion module is a set of conversion calculation formulas. Preferably, the analog-to-digital conversion module is built in the USB control chip and the calibration device in a firmware manner. Moreover, the at least one preset conversion parameter is the important parameter involved in the calculation process of the analog-to-digital conversion module. The technologies of the analog-to-digital conversion module and the at least one preset conversion parameter are well known to those skilled in the art, and not redundantly described herein.

In a step S104, the calibration device uses the to-be-calibrated current backward calculation means in the calibration device and the at least one preset conversion parameter to generate and store a to-be-calibrated output current according to the analog-to-digital conversion value. Moreover, according to the number of the at least one preset conversion parameter, the steps S102, S103 and S104 may be performed for at least one time (i.e., once or plural times). Consequently, one or plural corresponding constant load currents are sequentially generated, one or plural corresponding analog-to-digital conversion values are sequentially generated, and one or plural corresponding to-be-calibrated output currents are sequentially generated.

In an embodiment, the calibration device uses the to-be-calibrated current backward calculation means with the analog-to-digital conversion module and the at least one preset conversion parameter to generate and store the to-be-calibrated output current according to the analog-to-digital conversion value.

In case that the number of the at least one preset conversion parameter is 2, the steps S102, S103 and S104 are performed twice. Consequently, two corresponding constant load currents are sequentially generated, two corresponding analog-to-digital conversion values are sequentially generated, and two corresponding to-be-calibrated output currents are sequentially generated. Similarly, in case that the number of the at least one preset conversion parameter is 3, the steps S102, S103 and S104 are performed three times. Consequently, three corresponding constant load currents are sequentially generated, three corresponding analog-to-digital conversion values are sequentially generated, and three corresponding to-be-calibrated output currents are sequentially generated. Similarly, in case that the number of the at least one preset conversion parameter is 4, the steps S102, S103 and S104 are performed four times. Consequently, four corresponding constant load currents are sequentially generated, four corresponding analog-to-digital conversion values are sequentially generated, and four corresponding to-be-calibrated output currents are sequentially generated.

In a step S105, the calibration device uses a conversion parameter calibration means in the calibration device to generate at least one calibrated conversion parameter according to the one or plural constant load currents and the one or plural to-be-calibrated output currents.

In a step S106, the at least one preset conversion parameter in the USB control chip is replaced with the at least one calibrated conversion parameter by the calibration device.

Consequently, the USB control chip uses the at least one calibrated conversion parameter to generate a calibrated analog-to-digital conversion value. In this way, an over current protection (OCP) mechanism can be accurately enabled.

In an embodiment, the USB control chip uses the at least one calibrated conversion parameter and the analog-to-digital conversion module to generate the calibrated analog-to-digital conversion value according to the one or plural constant load currents. Consequently, the over current protection (OCP) mechanism can be accurately enabled.

The calibration method of the first embodiment has the following features. For example, even if the USB control chip used in the step S103 is a low-level chip (e.g., the low-cost chip) with weak noise resistance capability or poor analog-to-digital conversion resolution and the analog-to-digital conversion value is erroneous, the to-be-calibrated output current can be restored and acquired by using the to-be-calibrated current backward calculation means and the at least one preset conversion parameter in the step S104. Consequently, the erroneous current value (i.e., the to-be-calibrated output current) corresponding to the analog-to-digital conversion value can be realized. After the step S105 is performed, the calibration device uses the conversion parameter calibration means in the calibration device to acquire the at least one calibrated conversion parameter with the compensation property according to the known and accurate constant load currents and the to-be-calibrated output currents with deviation. That is, after the above procedures are performed, the at least one calibrated conversion parameter ready to calibrate the USB control chip can be acquired.

As mentioned above, in the step S104, the calibration device uses the to-be-calibrated current backward calculation means with the analog-to-digital conversion module and the at least one preset conversion parameter to generate the to-be-calibrated output current through the backward calculation. Moreover, in the step S105, the constant load currents and the to-be-calibrated output currents are inputted into the calibration device, and the at least one calibrated conversion parameter is generated through conversion. The implementation examples of the steps S104 and S105 are not restricted. It is noted that numerous modifications and alterations may be made while retaining the teachings of the present invention.

Moreover, in the step S106, the at least one preset conversion parameter in the USB control chip is replaced with the at least one calibrated conversion parameter. The USB control chip uses the at least one calibrated conversion parameter and the analog-to-digital conversion module to generate the calibrated analog-to-digital conversion value. In this way, the over current protection (OCP) mechanism can be accurately enabled.

For clearly understanding the concepts of the present invention, some examples of the calibration method using two preset conversion parameters will be described as follows.

In the following embodiment, the USB control chip used in the calibration method of the present invention is a Type C Universal Serial Bus (USB-C) control chip with the Power Delivery (PD) function.

Figure 2A:
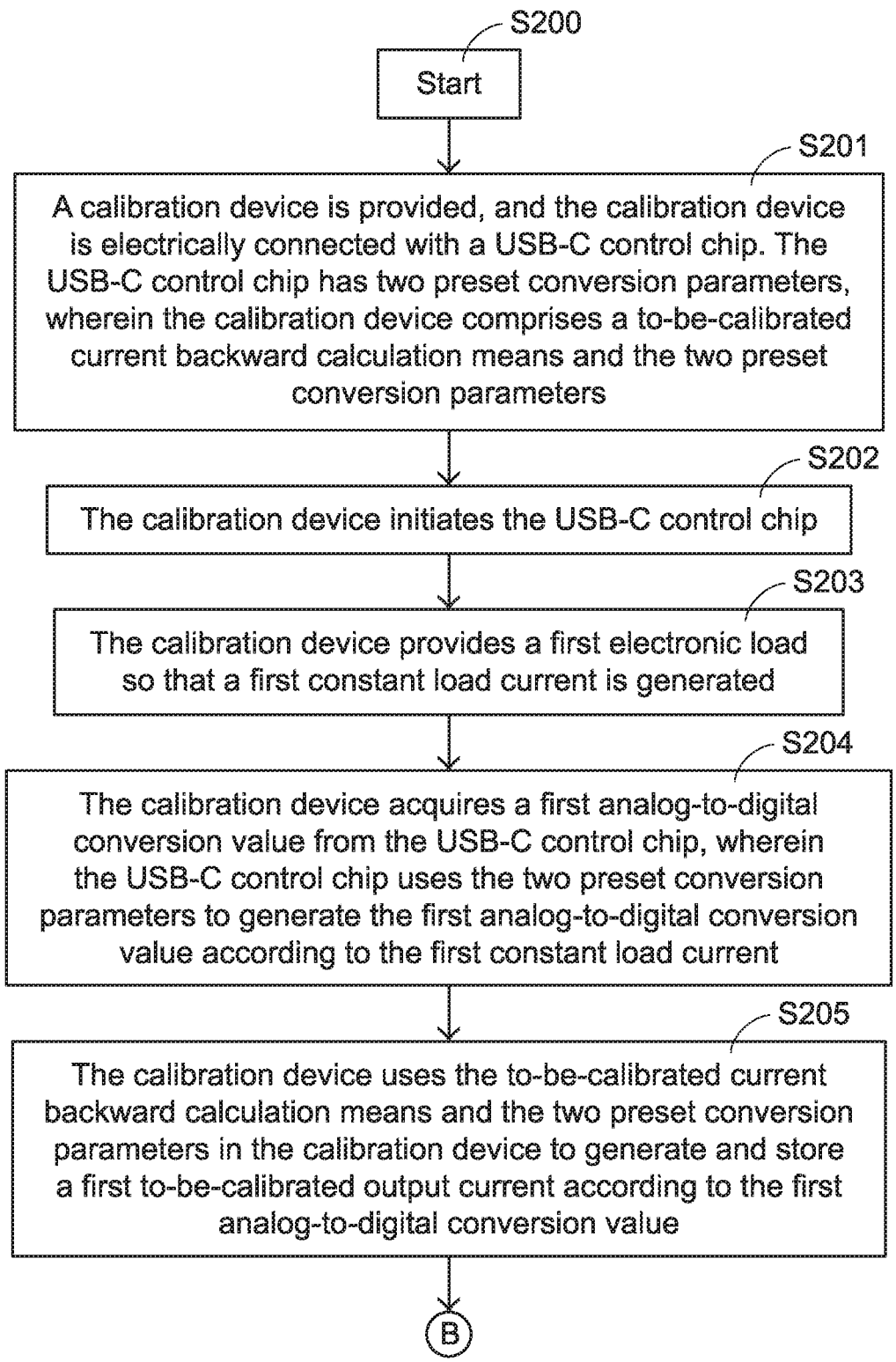
FIGS. 2A-2B and 2C illustrate a flowchart of a calibration method for a current detection and protection mechanism according to a second embodiment of the present invention.
Figure 2B:
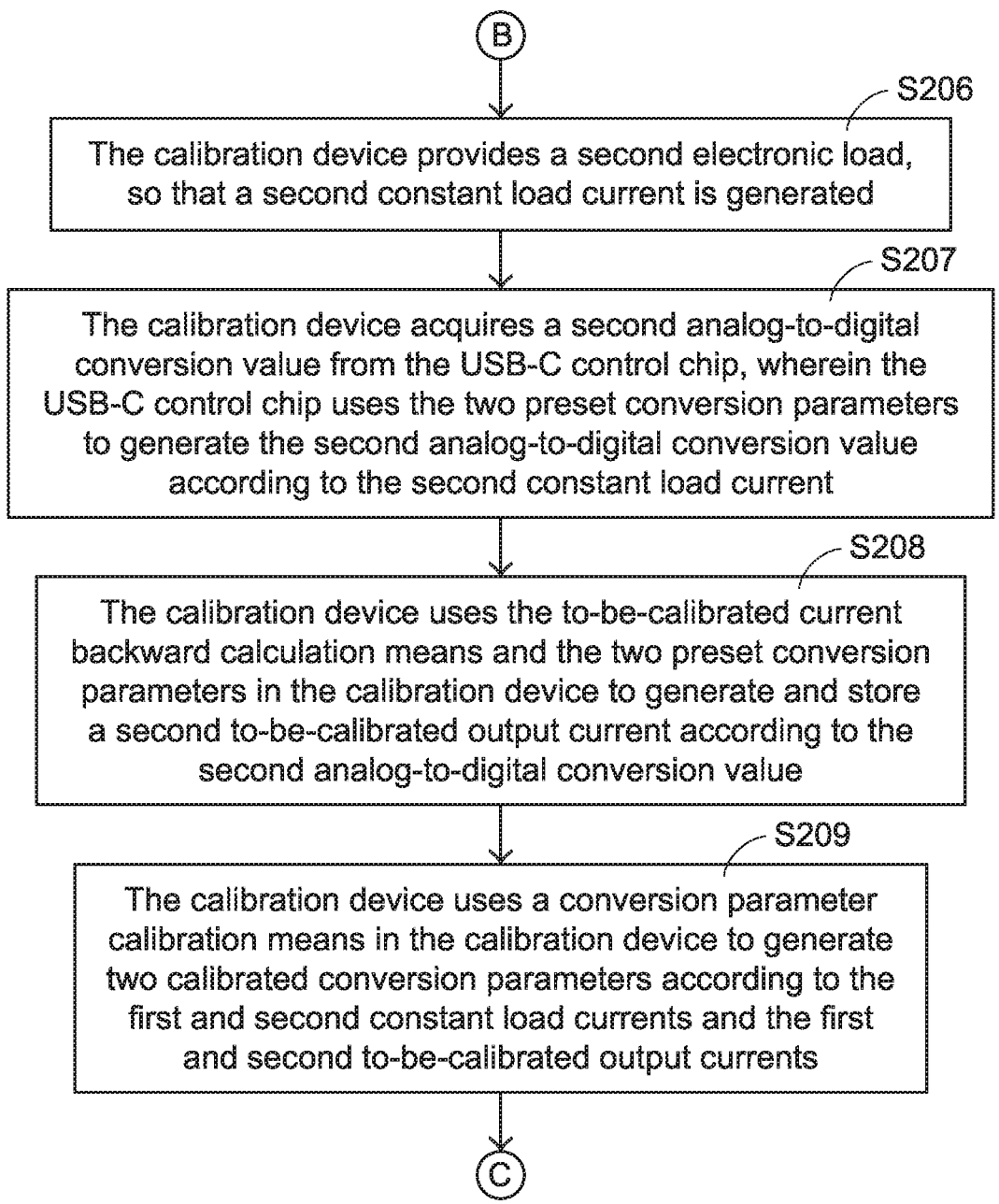
Figure 2C:
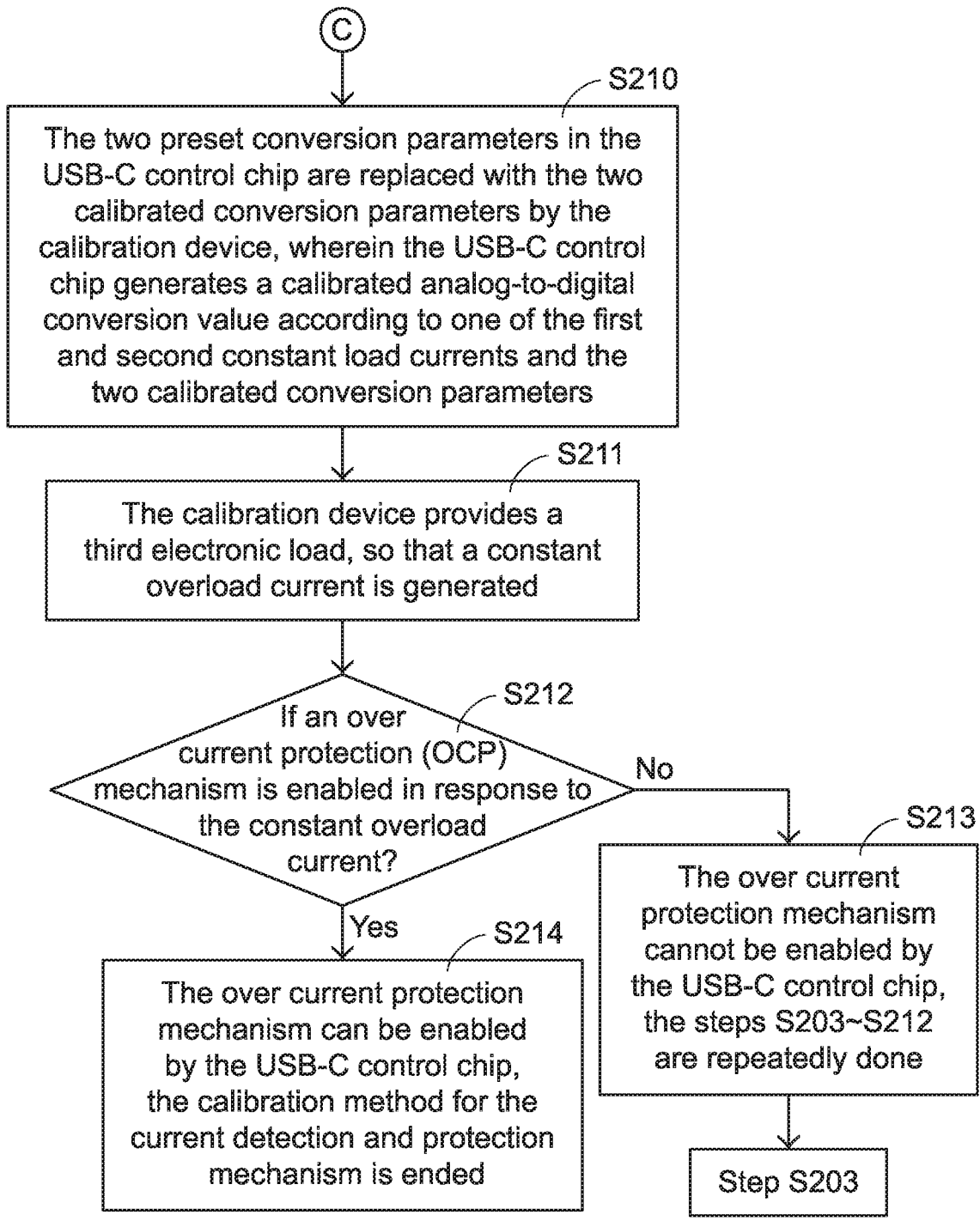

FIGS. 2A-2B and 2C illustrate a flowchart of a calibration method for a current detection and protection mechanism according to a second embodiment of the present invention. The calibration method at least comprises the following steps.

In a step S200, the calibration method is started.

In a step S201, a calibration device is provided, and the calibration device is electrically connected with a USB-C control chip. The USB-C control chip has two preset conversion parameters. The calibration device comprises a to-be-calibrated current backward calculation means and the two preset conversion parameters.

In an embodiment, the USB-C control chip is installed in an electronic product or an under-test circuit board. Moreover, the electronic product or the under-test circuit board is electrically connected with the calibration device. For example, the electronic product is a docking station. It is noted that the example of the electronic product is not restricted.

Moreover, the electronic product or the under-test circuit board is equipped with a USB port.

In a step S202, the calibration device initiates the USB-C control chip.

In an embodiment, a power interruption protection threshold for allowing the USB-C control chip to stop outputting a current is set by the calibration device in the initiating process. According to the power interruption protection threshold, the USB-C control chip determines whether an over current protection (OCP) mechanism is enabled.

In a step S203, the calibration device provides a first electronic load, so that a first constant load current is generated.

In a step S204, the calibration device acquires a first analog-to-digital conversion value (ADC value) from the USB-C control chip. The USB-C control chip uses the two preset conversion parameters to generate the first analog-to-digital conversion value according to the first constant load current.

In an embodiment, the USB-C control chip uses an analog-to-digital conversion module and the two preset conversion parameters to convert the first constant load current into the first analog-to-digital conversion value.

In an embodiment, the two preset conversion parameters match the analog-to-digital conversion module. Preferably but not exclusively, the to-be-calibrated current backward calculation means in the calibration device further comprises the analog-to-digital conversion module.

In a step S205, the calibration device uses the to-be-calibrated current backward calculation means and the two preset conversion parameters in the calibration device to generate and store a first to-be-calibrated output current according to the first analog-to-digital conversion value.

In an embodiment, the calibration device uses the to-be-calibrated current backward calculation means with the analog-to-digital conversion module and the two preset conversion parameters to generate and store the first to-be-calibrated output current according to the first analog-to-digital conversion value.

In a step S206, the calibration device provides a second electronic load, so that a second constant load current is generated.

In a step S207, the calibration device acquires a second analog-to-digital conversion value from the USB-C control chip. The USB-C control chip uses the two preset conversion parameters to generate the second analog-to-digital conversion value according to the second constant load current.

In an embodiment, the USB-C control chip uses the analog-to-digital conversion module and the two preset conversion parameters to convert the second constant load current into the second analog-to-digital conversion value.

In a step S208, the calibration device uses the to-be-calibrated current backward calculation means and the two preset conversion parameters in the calibration device to generate and store a second to-be-calibrated output current according to the second analog-to-digital conversion value.

In an embodiment, the calibration device uses the to-be-calibrated current backward calculation means with the analog-to-digital conversion module and the two preset conversion parameters to generate and store the second to-be-calibrated output current according to the second analog-to-digital conversion value.

In a step S209, the calibration device uses a conversion parameter calibration means in the calibration device to generate two calibrated conversion parameters according to the first and second constant load currents and the first and second to-be-calibrated output currents.

In a step S210, the two preset conversion parameters in the USB-C control chip are replaced with the two calibrated conversion parameters by the calibration device. Consequently, the USB-C control chip generates a calibrated analog-to-digital conversion value according to one of the first and second constant load currents and the two calibrated conversion parameters.

In a step S211, the calibration device provides a third electronic load, so that a constant overload current is generated.

In an embodiment, the constant overload current is higher than or equal to a power interruption protection threshold for allowing the USB-C control chip to stop outputting the current.

Then, a step S212 is performed to judge whether an over current protection (OCP) mechanism is enabled in response to the constant overload current.

If the judging result of the step S212 indicates that the over current protection mechanism cannot be enabled by the USB-C control chip, a step S213 is performed. That is, the steps S203-S212 are repeatedly done.

Whereas, if the judging result of the step S212 indicates that the over current protection mechanism can be enabled by the USB-C control chip, a step S214 is performed. That is, the calibration method for the current detection and protection mechanism is ended.

In an embodiment, when an output voltage from an over current protection pin (not shown) of the USB-C control chip is switched from a first voltage level state to a second voltage level state in response to the constant overload current, the over current protection mechanism is enabled by the USB-C control chip in the step S214. Whereas, when the output voltage from the over current protection pin of the USB-C control chip is maintained at the first voltage level state (i.e., not switched to the second voltage level state) in response to the constant overload current, the over current protection mechanism is not enabled by the USB-C control chip in the step S213.

Hereinafter, two examples of the calibration method will be described for understanding the concepts of the present invention.

In a first example, it is assumed that the power interruption protection threshold for enabling the over current protection mechanism is 4.5 A and the first constant load current and the second constant load current are set as 2 A and 4.25 A to represent the real output current values of the USB-C control chip. Consequently, the USB-C control chip uses the two preset conversion parameters to generate the first analog-to-digital conversion value and the second analog-to-digital conversion value according to the first constant load current (i.e., 2 A) and the second constant load current (e.g., 4.25 A). For example, the first analog-to-digital conversion value and the second analog-to-digital conversion value are 8-bit analog-to-digital conversion values. After the calibration device acquires the first analog-to-digital conversion value and the second analog-to-digital conversion value, the calibration device uses the to-be-calibrated current backward calculation means and the two preset conversion parameters to generate the first to-be-calibrated output current (e.g., 2.5 A) and the second to-be-calibrated output current (e.g., 5 A) through the backward calculation. Obviously, it is found that the first analog-to-digital conversion value and the second analog-to-digital conversion value generated by the USB-C control chip are in the erroneous condition. Consequently, the first to-be-calibrated output current (e.g., 2.5 A) and the second to-be-calibrated output current (e.g., 5 A) obtained through the backward calculation are not equal to the first constant load current (i.e., 2 A) and the second constant load current (e.g., 4.25 A), respectively.

If no calibration measurement is taken, the erroneous second to-be-calibrated output current (e.g., 5 A) is obviously higher than the power interruption protection threshold (e.g., 4.5 A). However, although the real output current from the USB-C control chip is only 4.25 A (i.e., the second constant load current), the USB-C control chip may early enable the over current protection mechanism to stop outputting current because of the erroneous second to-be-calibrated output current (e.g., 5 A). Consequently, the electronic device electrically connected with the USB-C control chip cannot be powered by the USB-C control chip.

By using the calibration method of the present invention, the following steps are performed. Then, the calibration device uses the conversion parameter calibration means to generate two calibrated conversion parameters according to the first constant load current (i.e., 2 A), the second constant load current (e.g., 4.25 A), the first to-be-calibrated output current (e.g., 2.5 A) and the second to-be-calibrated output current (e.g., 5 A). Then, the two preset conversion parameters are replaced with the two calibrated conversion parameters. Consequently, the USB-C control chip generates the calibrated analog-to-digital conversion values. In this way, the over current protection mechanism can be accurately enabled. For example, if the USB-C control chip generates the second constant load current (e.g., 4.25 A) according to the second electronic load again, the USB-C control chip can generate the accurate analog-to-digital conversion value (i.e., corresponding to 4.25 A). Under this circumstance, the over current protection mechanism is not enabled early. In other words, the problem of improperly stopping outputting the current will be avoided.

In a second example, it is assumed that the power interruption protection threshold for enabling the over current protection mechanism is set as 3.5 A according to the level (watt) of the output power and the first constant load current and the second constant load current are set as 2.5 A and 3.8 A to represent the real output current values of the USB-C control chip. Consequently, the USB-C control chip uses the two preset conversion parameters to generate the first analog-to-digital conversion value and the second analog-to-digital conversion value according to the first constant load current (i.e., 2.5 A) and the second constant load current (e.g., 3.8 A). For example, the first analog-to-digital conversion value and the second analog-to-digital conversion value are 8-bit analog-to-digital conversion values. After the calibration device acquires the first analog-to-digital conversion value and the second analog-to-digital conversion value, the calibration device uses the to-be-calibrated current backward calculation means and the two preset conversion parameters to generate the first to-be-calibrated output current (e.g., 2.2 A) and the second to-be-calibrated output current (e.g., 3.3 A) through the backward calculation. Obviously, it is found that the first analog-to-digital conversion value and the second analog-to-digital conversion value generated by the USB-C control chip are also in the erroneous condition. Consequently, the first to-be-calibrated output current (e.g., 2.2 A) and the second to-be-calibrated output current (e.g., 3.3 A) obtained through the backward calculation are not equal to the first constant load current (i.e., 2.5 A) and the second constant load current (e.g., 3.8 A), respectively.

If no calibration measurement is taken, the erroneous second to-be-calibrated output current (e.g., 3.3 A) is obviously lower than the power interruption protection threshold (e.g., 3.8 A). However, although the real output current from the USB-C control chip is up to 3.8 A (i.e., the second constant load current), the over current protection mechanism is still not enabled. That is, the over current protection mechanism is enabled too late. Consequently, the electronic device electrically connected with the USB-C control chip is in a dangerous condition of undergoing a large surge current.

By using the calibration method of the present invention, the following steps are performed. Then, the calibration device uses the conversion parameter calibration means to generate two calibrated conversion parameters according to the first constant load current (i.e., 2.5 A), the second constant load current (e.g., 3.8 A), the first to-be-calibrated output current (e.g., 2.2 A) and the second to-be-calibrated output current (e.g., 3.3 A). Then, the two preset conversion parameters are replaced with the two calibrated conversion parameters. Consequently, the USB-C control chip generates the calibrated analog-to-digital conversion values. In this way, the over current protection mechanism can be accurately enabled. For example, if the USB-C control chip generates a constant overload current (e.g., equal to or higher than 3.5 A) according to another electronic load (i.e., the third electronic load), the USB-C control chip can generate the accurate analog-to-digital conversion value. Under this circumstance, USB-C control chip can accurately and instantly enable the over current protection mechanism to stop outputting the current.

The present invention provides a calibration device for a current detection and protection mechanism. Hereinafter, two embodiments of the calibration device will be provided for illustration. It is noted that the examples of the calibration device are not restricted.

In the following embodiment, the USB control chip for the calibration device of the present invention is a Type C Universal Serial Bus (USB-C) control chip with the Power Delivery (PD) function.

Figure 3:
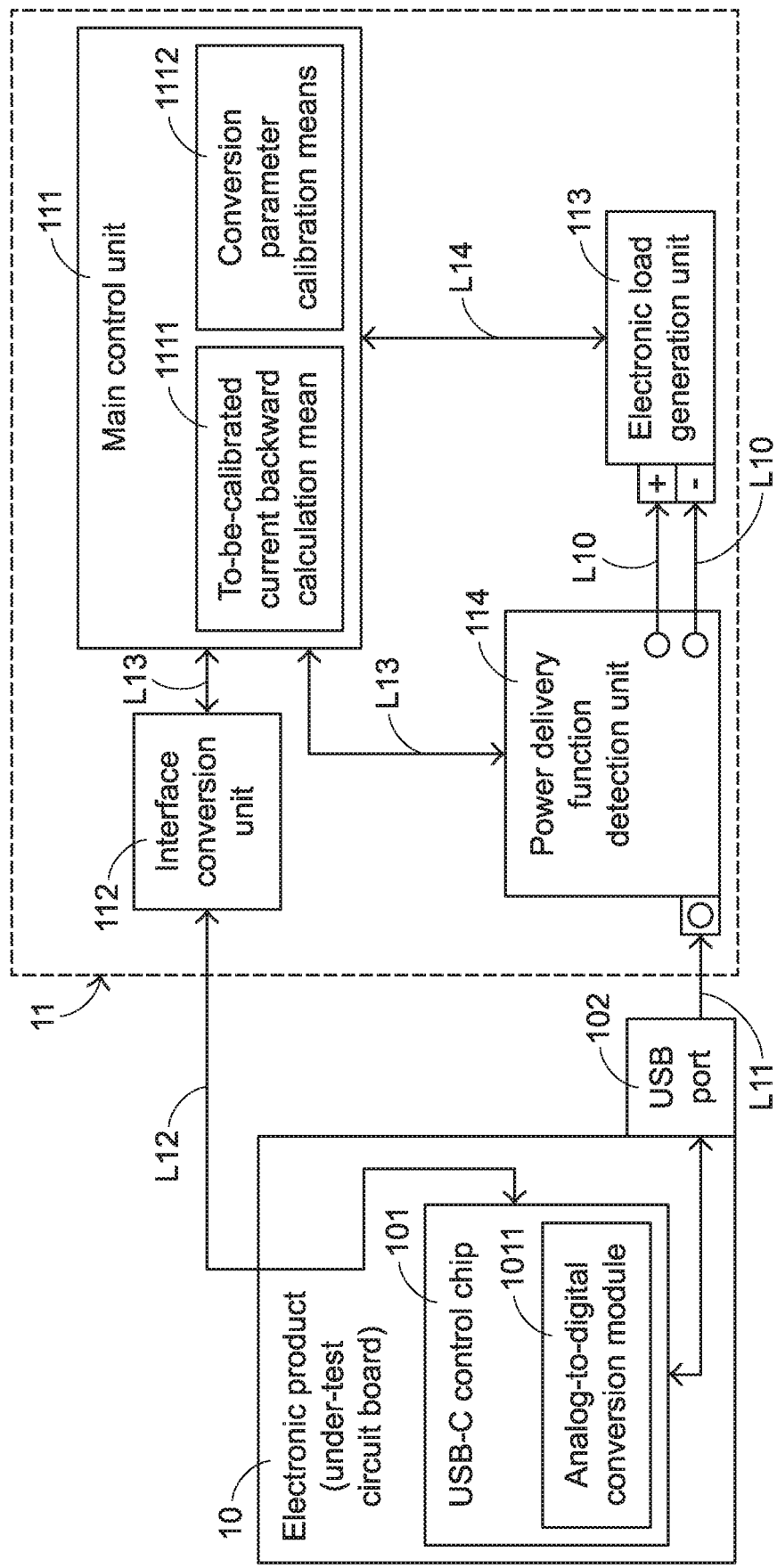
FIG. 3 is a schematic block diagram illustrating the architecture of a calibration device for a current detection and protection mechanism according to a first embodiment of the present invention.

FIG. 3 is a schematic block diagram illustrating the architecture of a calibration device for a current detection and protection mechanism according to a first embodiment of the present invention. As shown in FIG. 3, the calibration device 11 at least comprises a main control unit 111, an interface conversion unit 112, an electronic load generation unit 113 and a power delivery function detection unit 114. In addition, a USB-C control chip 101 is installed in an electronic product (or an under-test circuit board) 10 with a USB port 102.

The electronic load generation unit 113 is electrically connected with the power delivery function detection unit 114 through an electric connection path L10, which can provide positive/negative power. The power delivery function detection unit 114 is electrically connected with the USB-C control chip 101 through an electric connection path L11, which allows for the signal transmission of a power cable set of the USB port 102 (e.g., the VBUS signal). That is, the power cable set of the USB port 102 is electrically connected with the electronic load generation unit 113 through the power delivery function detection unit 114 indirectly.

The interface conversion unit 112 and the USB-C control chip 101 are electrically connected with each other through an electric connection path L12. The electric connection path L12 complies with a non-universal serial bus transfer specification. Preferably but not exclusively, the non-universal serial bus transfer specification is one of an Inter-Integrated Circuit (I$^2$C) bus transfer specification, a Universal Asynchronous Receiver Transmitter (UART) bus transfer specification and a Serial Peripheral Interface (SPI) bus transfer specification.

The main control unit 111 is electrically connected with the interface conversion unit 112 through an electric connection path L13, and the main control unit 111 is electrically connected with the power delivery function detection unit 114 through the electric connection path L13. Generally, the electric connection path L13 complies with the universal serial bus (USB) transfer specification. The main control unit 111 is electrically connected with the electronic load generation unit 113 through an electric connection path L14. Preferably but not exclusively, the electric connection path L14 complies with the Universal Asynchronous Receiver Transmitter (UART) bus transfer specification.

The operating principles of the calibration device as shown in FIG. 3 will be briefly described as follows.

The electronic load generation unit 113 provides an electronic load, so that the USB-C control chip 101 generates a constant load current. In addition, the USB-C control chip 101 uses the at least one preset conversion parameter to generate an analog-to-digital conversion value (ADC value) according to the constant load current. In an embodiment, the USB-C control chip 101 uses an analog-to-digital conversion module 1011 and the at least one preset conversion parameter matching the analog-to-digital conversion module 1011 to convert the constant load current into the analog-to-digital conversion value. In an embodiment, the analog-to-digital conversion module 1011 is a set of conversion calculation formulas. Optionally, the analog-to-digital conversion module 1011 is built in the USB-C control chip in a firmware manner.

By the interface conversion unit 112, the analog-to-digital conversion value not complying with the USB transfer specification can be converted into the analog-to-digital conversion value complying with the USB transfer specification. Consequently, the analog-to-digital conversion value complying with the USB transfer specification can be inputted into the main control unit 111. In addition, the main control unit 111 using a to-be-calibrated current backward calculation means 1111 and the at least one preset conversion parameter in the main control unit 111 to generate and store at least one to-be-calibrated output current according to the analog-to-digital conversion value complying with the USB transfer specification. In addition, the main control unit 111 uses a conversion parameter calibration means 1112 in the main control unit 111 to generate at least one calibrated conversion parameter according to the constant load current and the to-be-calibrated output current.

In an embodiment, the to-be-calibrated current backward calculation means 1111 of the main control unit 111 also comprises the analog-to-digital conversion module 1011. It is preferred that the analog-to-digital conversion module 1011 is the set of conversion calculation formulas as mentioned above. Preferably but not exclusively, the analog-to-digital conversion module 1011 is optionally built in the main control unit 111 in a firmware manner or a software manner.

Then, the at least one preset conversion parameter in the USB-C control chip 101 is replaced with the at least one calibrated conversion parameter by the main control unit 111. Consequently, the USB-C control chip 101 uses the at least one calibrated conversion parameter to generate a calibrated analog-to-digital conversion value. In this way, an over current protection (OCP) mechanism can be accurately enabled.

As mentioned above, the USB-C control chip has the Power Delivery (PD) function. The allowable magnitude of the output current according to the PD function protocol is related to a voltage specification range according to the PD function protocol. The main control unit 111 can communicate with the USB-C control chip 101 through the power delivery function detection unit 114 to confirm a specified output voltage within the voltage specification range. Consequently, the electronic load generation unit 113 generates the corresponding electronic load. According to the electronic load, the USB-C control chip 101 generates and outputs the constant load current.

Figure 4:
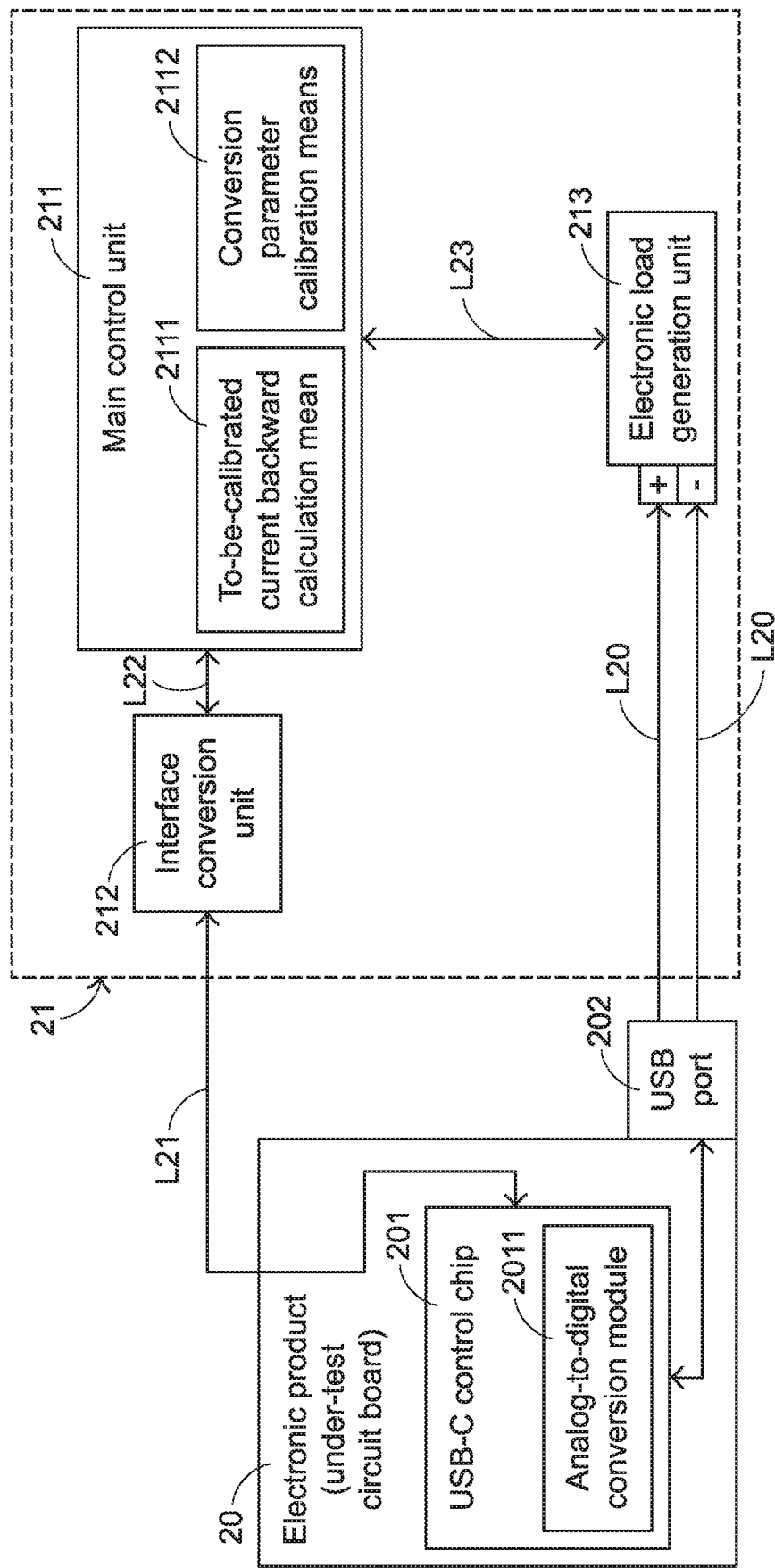
FIG. 4 is a schematic block diagram illustrating the architecture of a calibration device for a current detection and protection mechanism according to a second embodiment of the present invention.

FIG. 4 is a schematic block diagram illustrating the architecture of a calibration device for a current detection and protection mechanism according to a second embodiment of the present invention. As shown in FIG. 4, the calibration device 21 at least comprises a main control unit 211, an interface conversion unit 212 and an electronic load generation unit 213. In addition, a USB-C control chip 201 is installed in an electronic product (or an under-test circuit board) 20 with a USB port 202. The USB-C control chip 201 has an analog-to-digital conversion module 2011.

The functions and operations of the components in the calibration device of FIG. 4 are identical or similar to those of the calibration device of FIG. 3. Moreover, the electric connection paths L21, L22 and L23 of FIG. 4 are respectively similar to the electric connection paths L12, L13 and L14 of FIG. 3, and not redundantly described herein.

In comparison with the embodiment of FIG. 3, the calibration device of FIG. 4 is not equipped with the power delivery function detection unit 114. In other words, the power cable set of the USB port 202 (e.g., the VBUS signal protocol) is electrically connected with the electronic load generation unit 213 through the electric connection path L20 directly. Consequently, the USB-C control chip 201 can directly generate and output the constant load current according to the electronic load from the electronic load generation unit 213.

From the above descriptions, the calibration method and the calibration device of the present invention can effectively and accurately calibrate the USB-C control chips 101 and 201 while reducing the fabricating cost of the electronic product. Consequently, the real output current value can be accurately converted and recorded. In this way, the over current protection mechanisms of the USB-C control chips 101 and 201 can be accurately enabled. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A calibration method for a current detection and protection mechanism, the calibration method being used with a universal serial bus control chip, the calibration method comprising steps of:
   (a) providing a calibration device and electrically connecting the calibration device with the universal serial bus control chip, wherein the universal serial bus control chip has at least one preset conversion parameter, and the calibration device comprises a to-be-calibrated current backward calculation means and the at least one preset conversion parameter;
   (b) the calibration device providing an electronic load, so that a constant load current is generated;
   (c) the calibration device acquiring an analog-to-digital conversion value from the universal serial bus control chip, wherein the universal serial bus control chip uses the at least one preset conversion parameter to generate the analog-to-digital conversion value according to the constant load current;
   (d) the calibration device using the to-be-calibrated current backward calculation means and the at least one preset conversion parameter in the calibration device to generate and store a to-be-calibrated output current according to the analog-to-digital conversion value, wherein according to a number of the at least one preset conversion parameter, the steps (b), (c) and (d) are performed for one or plural times, so that one or plural constant load currents are sequentially generated, one or plural analog-to-digital conversion values are sequentially generated, and one or plural to-be-calibrated output currents are sequentially generated;
   (e) the calibration device using a conversion parameter calibration means in the calibration device to generate at least one calibrated conversion parameter according to the one or plural constant load currents and the one or plural to-be-calibrated output currents; and
   (f) replacing the at least one preset conversion parameter in the universal serial bus control chip with the at least one calibrated conversion parameter by the calibration device, wherein the universal serial bus control chip uses the at least one calibrated conversion parameter to generate a calibrated analog-to-digital conversion value, so that an over current protection (OCP) mechanism is accurately enabled.

2. The calibration method according to claim 1, wherein before the step (b), the calibration method further comprises a step (b1) of initializing the universal serial bus control chip by the calibration device.

3. The calibration method according to claim 1, wherein in the step (c), the universal serial bus control chip uses an analog-to-digital conversion module and the at least one preset conversion parameter to convert the constant load current into the analog-to-digital conversion value.

4. The calibration method according to claim 3, wherein the at least one preset conversion parameter and the analog-to-digital conversion module match each other, and the to-be-calibrated current backward calculation means in the calibration device further comprises the analog-to-digital conversion module.

5. The calibration method according to claim 1, wherein the number of the at least one preset conversion parameter is 2 in the step (d), and the steps (b), (c) and (d) are performed twice, wherein the calibration device generates two constant load currents sequentially, the universal serial bus control chip generates two analog-to-digital conversion values sequentially according to the two constant load currents, and the calibration device generates two to-be-calibrated output currents sequentially according to the two analog-to-digital conversion values.

6. The calibration method according to claim 5, wherein in the step (e), the calibration device uses the conversion parameter calibration means in the calibration device to generate two calibrated conversion parameters according to the two constant load currents and the two to-be-calibrated output currents.

7. The calibration method according to claim 1, wherein the step (f) comprises steps of:
   (f1) replacing the at least one preset conversion parameter in the universal serial bus control chip with the at least one calibrated conversion parameter by the calibration device, wherein the universal serial bus control chip uses the at least one calibrated conversion parameter to generate the calibrated analog-to-digital conversion value according to the constant load current;
   (f2) the calibration device providing another electronic load, so that a constant overload current is generated;
   (f3) judging whether the over current protection mechanism is enabled by the universal serial bus control chip in response to the constant overload current;
   (f4) if the over current protection mechanism is not enabled by the universal serial bus control chip, repeatedly performing the steps (b), (c), (d), (f1), (f2) and (f3); and
   (f5) if the over current protection mechanism is enabled by the universal serial bus control chip, ending the calibration method.

8. The calibration method according to claim 7, wherein in the step (f2), the constant overload current is higher than or equal to a power interruption protection threshold for allowing the universal serial bus control chip to stop outputting a current.

9. The calibration method according to claim 8, wherein in the steps (f4) and (f5), the over current protection mechanism is enabled when an output voltage from an over current protection pin of the universal serial bus control chip is switched from a first voltage level state to a second voltage level state in response to the constant overload current, and the over current protection mechanism is not enabled when the output voltage from the over current protection pin of the universal serial bus control chip is maintained at the first voltage level state and not switched to the second voltage level state in response to the constant overload current.

10. The calibration method according to claim 1, wherein the universal serial bus control chip is a Type C universal serial bus (USB-C) control chip complying with a Power Delivery (PD) function protocol.

11. The calibration method according to claim 10, wherein the Type C universal serial bus control chip is installed in an electronic product or an under-test circuit board, wherein the electronic product or the under-test circuit board is electrically connected with the calibration device, and the electronic product or the under-test circuit board is equipped with a universal serial bus port.

12. A calibration device for a current detection and protection mechanism, the calibration device being used with a universal serial bus control chip with at least one preset conversion parameter, the calibration device comprising:
   an electronic load generation unit electrically connected with the universal serial bus control chip, wherein the electronic load generation unit provides an electronic load, so that the universal serial bus control chip generates a constant load current, wherein the universal serial bus control chip uses the at least one preset conversion parameter to generate an analog-to-digital conversion value according to the constant load current;

an interface conversion unit electrically connected with the universal serial bus control chip, wherein if the analog-to-digital conversion value does not comply with a universal serial bus transfer specification, the analog-to-digital conversion value is converted into the analog-to-digital conversion value complying with the universal serial bus transfer specification by the interface conversion unit; and a main control unit electrically connected with the electronic load generation unit and the interface conversion unit, wherein after the analog-to-digital conversion value complying with the universal serial bus transfer specification is inputted into the main control unit, the main control unit uses a to-be-calibrated current backward calculation means in the calibration device and the at least one preset conversion parameter to generate and store a to-be-calibrated output current according to the analog-to-digital conversion value complying with the universal serial bus transfer specification, wherein the main control unit uses a conversion parameter calibration means in the main control unit to generate at least one calibrated conversion parameter according to the constant load current and the to-be-calibrated output current, wherein the at least one preset conversion parameter in the universal serial bus control chip is replaced with the at least one calibrated conversion parameter by the main control unit, and the universal serial bus control chip uses the at least one calibrated conversion parameter to generate a calibrated analog-to-digital conversion value, so that an over current protection mechanism is accurately enabled.

13. The calibration device according to claim 12, wherein the universal serial bus control chip is a Type C universal serial bus (USB-C) control chip complying with a Power Delivery (PD) function protocol.

14. The calibration device according to claim 13, wherein the Type C universal serial bus control chip is installed in an electronic product or an under-test circuit board, wherein the electronic product or the under-test circuit board is electrically connected with the electronic load generation unit and the interface conversion unit.

15. The calibration device according to claim 14, wherein the electronic product or the under-test circuit board is equipped with a universal serial bus port, and a power cable set of the universal serial bus port is electrically connected with the electronic load generation unit directly, so that the Type C universal serial bus control chip generates and outputs the constant load current according to the electronic load.

16. The calibration device according to claim 14, wherein the calibration device further comprises a power delivery function detection unit, and the power delivery function detection unit is electrically connected between the universal serial bus port and the electronic load generation unit, wherein a power cable set of the universal serial bus port is electrically connected with the electronic load generation unit directly, so that the Type C universal serial bus control chip generates and outputs the constant load current according to the electronic load.

17. The calibration device according to claim 16, wherein the power delivery function detection unit is electrically connected between the universal serial bus port and the main control unit, wherein the main control unit communicate with the Type C universal serial bus control chip through the power delivery function detection unit to confirm a voltage specification range according to the Power Delivery function protocol, so that the electronic load generation unit generates the corresponding electronic load, wherein the Type C universal serial bus control chip generates and outputs the constant load current according to the electronic load.

18. The calibration device according to claim 12, wherein the calibration device provides another electronic load, so that the universal serial bus control chip generates a constant overload current, wherein the over current protection mechanism is accurately enabled by the universal serial bus control chip in response to the constant overload current, wherein the over current protection mechanism is enabled when an output voltage from an over current protection pin of the universal serial bus control chip is switched from a first voltage level state to a second voltage level state in response to the constant overload current.

19. The calibration device according to claim 12, wherein each of the universal serial bus control chip and the to-be-calibrated current backward calculation means in the main control unit further comprises an analog-to-digital conversion module, and the universal serial bus control chip uses the analog-to-digital conversion module and the at least one preset conversion parameter to convert the constant load current into the analog-to-digital conversion value, or wherein the universal serial bus control chip uses the analog-to-digital conversion module and the at least one at least one calibrated conversion parameter to convert the constant load current into the calibrated analog-to-digital conversion value, or wherein the main control unit uses the to-be-calibrated current backward calculation means with the analog-to-digital conversion module and the at least one preset conversion parameter to generate and store the to-be-calibrated output current.

20. The calibration device according to claim 12, wherein the non-universal serial bus transfer specification is one of an Inter-Integrated Circuit (I²C) bus transfer specification, a Universal Asynchronous Receiver Transmitter (UART) bus transfer specification and a Serial Peripheral Interface (SPI) bus transfer specification.

* * * * *